United States Patent
Parfondry et al.

(10) Patent No.: US 6,506,813 B1
(45) Date of Patent: Jan. 14, 2003

(54) PROCESS FOR MAKING COLD-SETTING FLEXIBLE FOAMS, POLYOL COMPOSITION AND REACTION SYSTEM USEFUL THEREFOR, FOAMS THUS OBTAINED

(75) Inventors: Alain Parfondry, Brussels (BE); Jianming Yu, Brussels (BE)

(73) Assignee: Huntsman International, LLC, Salt Lake City, UT (US)

( * ) Notice: Subject to any disclaimer, the term of this patent is extended or adjusted under 35 U.S.C. 154(b) by 300 days.

(21) Appl. No.: 10/030,385

(22) PCT Filed: Jul. 3, 2000

(86) PCT No.: PCT/EP00/06186

§ 371 (c)(1),
(2), (4) Date: Jan. 10, 2002

(87) PCT Pub. No.: WO01/07521

PCT Pub. Date: Feb. 1, 2001

(30) Foreign Application Priority Data

Jul. 26, 1999 (EP) .............................. 99114600

(51) Int. Cl.[7] .............................. C08G 18/48
(52) U.S. Cl. ............. 521/174; 252/182.25; 252/182.26; 252/182.27; 521/130; 521/167
(58) Field of Search ................................. 521/167, 130, 521/174; 252/182.25, 182.26, 182.27

(56) References Cited

U.S. PATENT DOCUMENTS

| 5,476,969 | A | | 12/1995 | Hinz et al. | |
|---|---|---|---|---|---|
| 5,672,636 | A | | 9/1997 | Horn et al. | |
| 5,874,485 | A | | 2/1999 | Madan et al. | |
| 6,034,197 | A | * | 3/2000 | Mahon et al. | ......... 252/182.25 |
| 6,284,812 | B1 | * | 9/2001 | Rotermund et al. | ........ 521/131 |

FOREIGN PATENT DOCUMENTS

JP          61151224          7/1986

* cited by examiner

Primary Examiner—John M. Cooney, Jr.
(74) Attorney, Agent, or Firm—Pillsbury Winthrop LLP

(57) ABSTRACT

The invention relates to a polyol composition comprising b1) a polyol where the EO content is at least 50%; b2) a polyol having a primary hydroxyl content of at least 50%; b3) an amine-initiated polyoxypropylene polyol having an OH value greater than 400, according to the following proportions: b1: 20–70 wt %, b2: 5–50 wt %, b3: 5–50 wt %. The invention also relates to a process for preparing a cold-setting flexible polyurethane foam at NCO index of 70–120 by reacting a) a polyisocyanate; the polyols b1), b2) and b3); c) water; and d) additives and auxiliaries known per se. The invention finally relates to a reaction system comprising A) a polyisocyanate and B) an isocyanate-reactive component comprising the polyols b1), b2) and b3).

18 Claims, No Drawings

PROCESS FOR MAKING COLD-SETTING FLEXIBLE FOAMS, POLYOL COMPOSITION AND REACTION SYSTEM USEFUL THEREFOR, FOAMS THUS OBTAINED

This application is the National Phase of International Application PCT/EP00/06186 filed Jul. 3, 2000, which designated the U.S. and that International Application was published under PCT Article 21(2) in English. The PCT application is hereby incorporated in its entirety by reference.

The instant invention relates to a process for making cold-setting flexible foams. It also relates to a specific polyol composition and to a reaction system that are useful in the said process, as well as to the foams thus-obtained.

Cold-setting flexible polyurethane foams, that are useful e.g. for sound damping, i.e. visco-elastic foams, are known. However, the current processes and foams suffer from drawbacks. Firstly, there is a growing concern regarding the safety, health and environment. The current foams that are used nowadays are manufactured using amine-based catalysts. While these catalysts have proven their usefulness, they exhibit drawbacks such as volatility, resulting in smelling, fogging (fouling of inner glass surfaces, e.g. in automotive vehicles, because of condensation of volatile residues from polymers, etc.), and residual basicity. Secondly, there is a growing concern regarding the handling of the raw materials during the manufacture of the foam. In case of visco-elastic foams, notably those used for sound insulation in automotives, it is customary to use polyols blends. However, the polyols of the blends are often not miscible with each other, thus producing polyols blends that are not homogeneous. Thirdly, current visco-elastic foams, while they exhibit good damping properties, often show a high compression set, which is detrimental to the foam.

Thus, there is still a need for a composition that would produce foams that would meet the requirements of safety, health and environment, i.e. that would require a lower amount of amine catalyst, and that could be produced from more stable, homogeneous, polyol blends and that would show good damping properties together with a low compression set.

U.S. Pat. No. 5,063,253 discloses a process for preparing visco-elastic cold-setting flexible foams that are useful for damping sound comprising reacting a polyisocyanate in the presence of water with a) at least one polyether having an OH value of 20–60, based on propylene oxide (PO) and ethylene oxide (EO), the EO content being 5–25% by weight, b) a polyether or polyester having an OH value of 150–400, and c) a polyether different from a) and b), having an OH value of 20–200, based on PO and EO, the EO content being greater than 50%, where the amount of b) is from 10 to 20% and the amount of c) is 30 to 70%, by weight based on the combined weights of a), b) and c). The catalyst that is used is amine-based, and is used, according to the examples, in amounts from 1.20 to 1.33 parts by weight per 100 parts by weight of the above 3 polyols. EP-A-0 433 878 discloses a process for preparing visco-elastic cold-setting flexible foams that are useful for damping sound, comprising reacting a polyisocyanate in the presence of water with ai) a polyoxyethylene-polyoxypropylene having an OH value of 14–65, a functionality of 2.3–2.8, based on propylene oxide (PO) and tipped ethylene oxide (EO), the EO content being 2–9% by weight, aii) a polyoxyethylene-polyoxypropylene having an OH value of 20–80, based on propylene oxide (PO) and ethylene oxide (EO), the EO content being 60–85% by weight, b) a chain extender having a molecular weight of 18–400, which can be an amine-initiated polyol. The catalyst that is used is amine-based, and is used, according to the examples, in amounts that are at least 1%, by weight, based on the total weight of the reacting composition. The loss factor is said to be between 0.7 and 1.5.

None of the above documents teaches or suggests the instant invention.

The invention thus provides a polyol composition comprising:

b1) a polyoxyethylene-polyoxypropylene polyol, having an average nominal hydroxyl functionality of 2–6, where the EO is present as tipped EO and/or random EO, the total EO content being at least 50% by weight;

b2) a polyoxyethylene-polyoxypropylene polyol, having an average nominal hydroxyl functionality of 2–6 and having a primary hydroxyl content of at least 50%, the EO content being from 10 to 25% by weight;

b3) an amine-initiated polyoxypropylene polyol, having an average nominal hydroxyl functionality of 2–6, and having an OH value greater than 400 mg KOH/g, these polyols b1, b2 and b3 being present according to the following proportions, based on the combined weights of b1, b2 and b3, b1: 20–70 wt %, b2: 5–50 wt %, b3: 5–50 wt %.

In the context of the present invention the following terms, if and whenever they are used, have the following meaning:

1) isocyanate index or NCO index:
the ratio of NCO-groups over isocyanate-reactive hydrogen atoms present in a formulation, given as a percentage:

$$\frac{[NCO] \times 100}{[\text{active hydrogen}]} (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water, if used) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary or secondary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams)

5) The term "average nominal hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation.

6) The term "average" is used to indicate an average by number.

The following way of describing polyols is used in the present application: A PO-EO polyol is a polyol having first a PO block attached to the initiator followed by an EO block. A PO-PO/EO polyol is a polyol having first a PO block and then a block of randomly distributed PO and EO. A PO-PO/EO-EO polyol is a polyol having first a PO block then a block of randomly distributed PO and EO and then a block of EO. A PO-EO polyol is a polyol having first a PO block and then an EO block. In the above descriptions only one tail of a polyol is described (seen from the initiator); the nominal hydroxyl functionality will determine how many of such tails will be present.

The polyisocyanates may be selected from aliphatic, cycloaliphatic and araliphatic polyisocyanates, especially diisocyanates, like hexamethylene diisocyanate, isophorone diisocyanate, cyclohexane-1,4-diisocyanate, 4,4'-dicyclohexylmethane diisocyanate and m- and p-tetramethylxylylene diisocyanate, and in particular aromatic polyisocyanates like tolylene diisocyanates (TDI), phenylene diisocyanates and most preferably diphenylmethane diisocyanate optionally comprising homologues thereof having an isocyanate functionality of 3 or more (such diisocyanates comprising such homologues are known as crude MDI or polymeric MDI or mixtures of such crude or polymeric MDI with MDI) and modified variants thereof.

The diphenylmethane diisocyanate (MDI) used may be selected from 4,4'-MDI, 2,4'-MDI, isomeric mixtures of 4,4'-MDI and 2,4'-MDI and less than 10% by weight of 2,2'-MDI, and modified variants thereof containing carbodiimide, uretonimine, isocyanurate, urethane, allophanate, urea and/or biuret groups. Preferred are 4,4'-MDI, isomeric mixtures of 4,4'-MDI and 2,4'-MDI and less than 10% by weight of 2,2' MDI and uretonimine and/or carbodiimide modified MDI having an NCO content of at least 20% by weight and preferably at least 25% by weight and urethane modified MDI obtained by reacting excess MDI and polyol having a molecular weight of at most 1000 and having an NCO content of at least 20% by weight and preferably at least 25% by weight.

Diphenylmethane diisocyanate comprising homologues having an isoycanate functionality of 3 or more are so-called polymeric or crude MDI.

Polymeric or crude MDI are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisoycanates in such crude or polymeric MDI compositions determine the average functionality of the compositions, that is the average number of isocyanate groups per molecule. By varying the proportions of starting materials, the average functionality of the polysiocyanate compositions can be varied from little more than 2 to 3 or even higher. In practice, however, the average isocyanate functionality preferably ranges from more than 2 to 2.8. The NCO value of such polymeric or crude MDI is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation of polyamines. Further modified variants of such crude or polymeric MDI may be used as well comprising carbodiimide, uretonimine, isocyanurate, urethane, allophanate, urea and/or biuret groups; especially the aforementioned uretonimine and/or carbodiimide modified ones and the urethane modified ones are preferred. Mixtures of polyisocyanates may be used as well.

Mixtures of diphenylmethane diisocyanate optionally comprising homologues thereof having an isocyanate functionality of 3 or more and modified variants thereof with in particular up to 25% by weight of one or more of the other polyisocyanates mentioned above, especially TDI, may be used if desired.

The polyisocyanate may contain dispersed urea particles and/or urethane particles prepared in a conventional way, e.g. by adding a minor amount of an isophorone diamine to the polyisocyanate.

The invention also relates to a polyol composition, comprised of polyols b1, b2 and b3.

Polyol b1 is an EO rich polyol. It can be prepared by known methods. It comprises PO and EO, where the EO can be random, tipped, or both. Preferably the EO is random in majority. The EO content is greater than 50% by weight (over the total oxyalkylene units present).

Polyol b2 is the second polyol. It can be prepared by known methods. It has a primary hydroxyl content of at least 50%. It can be of various structures (PO-EO, PO/EO, etc.), where the EO can be either random, tipped, or both provided the primary hydroxyl content is at least 50%. The EO content is from 10 to 25% by weight (over the total oxyalkylene units present). A preferred polyol is one where EO is present as tipped EO.

Polyol b3 is one key feature of the invention. It is amine-initiated and has an OH value greater than 400, for example greater than 400 to 600. Since it is amine-initiated and has a low molecular weight, it may also partly act as an amine-based catalyst; since it will be bound as part of the structure of the foam, it will prevent release of amine-containing compounds from the foam. These amine-initiated low molecular weight polyols have been used so far only in relation with hard polyurethane foams. The amine initiators can be weak bases, and can be aromatic or aliphatic and preferably are aliphatic. Examples of aromatic amine initiators are MDA (4,4'-diphenylmethanediamine, isomers and oligomers thereof), aniline, TDA (toluenediamine, isomers and oligomers thereof). Non limiting examples of aliphatic amine initiators that can be used in the instant invention comprise triethanolamine, 1-(2-aminoethyl)piperazine, diethylenetriamine, triethylene-tetraamine, diethanolamine, monoethanolamine, 2-(2-aminoethoxy)ethanol, and the like.

One example of such a polyol is triethanolamine-initiated polyoxypropylene, containing about 4 PO units in each branch. The polyol b3 is used in amounts from 5 to 50% by weight, preferably at least 20% by weight.

The functionality of these polyols is 2 to 6, preferably 2 to 4.

For b1 and b2, the equivalent hydroxyl weight is generally 1000 to 4000, preferably 1200 to 3500.

The polyol composition comprises the various polyols according to the following proportions, expressed on the basis of the combined weights of the polyols:

b1: 20–70%, preferably 30–65%
b2: 5–50%, preferably 10–40%
b3: 5–50%, preferably more than 20% by weight, and more preferably 20–40%.

Dispersed material can also be present. This is known as polymer-modified polyol, and comprises e.g. SAN or PIPA (Poly Isocyanate Poly Addition).

The polymer-modified polyols which are particularly interesting in accordance with the invention are products obtained by in situ polymerization of styrene and/or acrylonitrile in poly(oxyethylene/oxypropylene)polyols and products obtained by in situ reaction between a polyisocyanate and an amino- or hydroxy-functional compound (such as triethanolamine) in a poly(oxyethylene/oxypropylene) polyol. The solids content (based on the total polyol weight b1+b2+b3) can vary within broad limits, e.g. from 5 to 50%. Particle sizes of the dispersed polymer of less than 50 microns are preferred. Mixtures can be used as well.

Water is used as the blowing agent. Carbon dioxide may be added if needed. In the case of highly resilient water blown flexible foams, it is appropriate to use from 1.0 to 15%, preferably from 1.5 to 6%, by weight of water based on the weight of the total polyol component (prereacted or not, i.e. the total starting polyol or total starting isocyanate-reactive compounds), where the water can optionally be used in conjunction with carbon dioxide.

Other conventional ingredients (additives and/or auxiliaries) may be used in making the polyurethanes. These includes catalysts, for example, tertiary amines and organic tin compounds, surfactants, cross linking or chain extending agents, for example, other polymers, e.g. polyols, known as modifiers for flexible foams, such as low molecular weight compounds such as diols, triols (different from polyol b3) and diamines, flame proofing agents, for example, halogenated alkyl phosphates, fillers and pigments. Foam stabilizers, for example polysiloxane-polyalkylene oxide block copolymers, may be used to stabilize or regulate the cells of the foam.

The amount of these minor ingredients used will depend on the nature of the product required and may be varied within limits well known to a polyurethane foam technologist.

One specific advantage of the process of the invention is that it requires a limited amount of amine-based catalysts. Examples of amine-based catalysts that can be used in the instant invention comprise aliphatic or alicyclic amines, such as Dabco 33LV, Dabco 8154, Dabco R8020, Niax A1, Niax A99, Niax A4, dimethylethanolamine, dimethylaminopropylamine,morpholine, N-alkyl morpholines, and the like. One will find other specific examples in the following publication: Flexible Polyurethane Foams, Chemistry and Technology, by G. Wood, 1982. The amount of amine-based catalyst used preferably is such that the corresponding amount of nitrogen (in % by weight calculated on 100 parts of the polyols b1), b2) and b3) and measured according to ISO 9702) is below 0.04% by weight.

In case of slabstock foams, it will be possible not to use any metal salt such as the traditional tin salt, while using even more limited amounts of amine catalysts. In case of metal-salt free slabstock foam preparation, the total amount of these amine-based catalysts is such that the corresponding amount of nitrogen preferably is below 0:01 and more preferably below 0.005% by weight.

The present invention also relates to a process for preparing a cold-setting flexible polyurethane foam at an NCO index of 70–120 by reacting:

a) a polyisocyanate composition;

b1) a polyoxyethylene-polyoxypropylene polyol, having an average nominal hydroxyl functionality of 2–6, where the EO is present as tipped EO and/or random EO, the total EO content being at least 50% by weight;

b2) a polyoxyethylene-polyoxypropylene polyol, having an average nominal hydroxyl functionality of 2–6 and having a primary hydroxy content of at least 50%, the EO content being from 10 to 25% by weight;

b3) an amine-initiated polyoxypropylene polyol, having an average nominal hydroxyl functionality of 2–6, these polyols b1, b2 and b3 being present according to the following proportions, based on the combined weights of b1, b2 and b3, b1: 30–70 wt %, b2: 5–50 wt %, b3: 5–50 wt %;

c) water; and d) additives and auxiliaries known per se.

These components, notably the polyols b1, b2 and b3 can be added in any order. Notably, the polyols can be added according to the following non-limiting possibilities:

Part of b1+b2+b3, then the remainder of b1+b2+b3;

Part of b1+b2 but no b3, then the remainder of b1+b2 and all b3;

Part of b1+b3 but no b2, then the remainder of b1+b3 and all b2;

all of b1, then the all of b2+b3; all of b2, then the all of b1+b3;

Part of b1, then the remainder of b1 together with the all of b2+b3;

Part of b2, then the remainder of b2 together with the all of b1+b3;

And any other possibility.

One preferred embodiment is when polyol b2 is reacted with the polyisocyanate a) to form a prepolymer. In this case, polyols b1 and b3 form the sole components of the polyols blends and the resulting blends are very homogeneous.

Of course, when the various components are fed to the mixing head as different streams (as can be the case for slabstock), then the homogeneity of the polyols blend is no longer relevant.

In the process of the invention, it is to be noted that one shot, prepolymer or quasi-prepolymer methods may thus be employed as may be appropriate for the particular type of polyurethane being made. The prepolymer may be a full prepolymer or only a partial prepolymer, and the NCO content may vary within broad limits that can be easily determined by the skilled man.

The components of the polyurethane forming reaction mixture may be mixed together in any convenient manner, the individual components may be pre-blended so as to reduce the number of component streams which need to be brought together in the final mixing step. It is often convenient to have a two-stream system whereby one stream comprises a polyisocyanate or isocyanate-terminated prepolymer and the second stream comprises all the other components of the reaction mixture.

The flexible foams may be made according to the moulding or the slabstock technique; it may be free rise foam or foam with restricted rise. The foams may be used in the furniture and automotive industries in seating, cushioning and mattresses.

The flexible foams thus obtained have very good damping properties (low resilience such as a Toyota resilience below 20%, preferably below 10%), very low compression set (at 75% compression), both dry and humid (such as below 5%, preferably below 2%), require a very limited amount of amine-based catalysts.

The invention thus also relates to these foams that are obtainable by the process of the invention.

The invention also provides a reaction system that will enable the foam producer to make the desired foam by reacting the polyisocyanate and polyol compositions. This approach provides a relatively simple way to the customer to make a product from often a variety of chemicals by combining two compositions under appropriate conditions. In a first embodiment, the polyisocyanate (optionally with the chain extender and/or the catalyst) is one component while the isocyanate-reactive component comprises the polyols, water and the additives and auxiliaries. According to another embodiment, the polyisocyanate component can be a prepolymer, while the isocyanate-reactive component comprises the remainder of the polyols. Under this embodiment, any combination is foreseen. It covers notably the following possibilities: Part of b1+b2+b3, then the remainder of b1+b2+b3; Part of b1+b2 but no b3, then the remainder of b1+b2 and all b3; Part of b1+b3 but no b2, then the remainder of b1+b3 and all b2; all of b1, then the all of b2+b3; all of b2, then the all of b1+b3; Part of b1, then the remainder of b1 together with the all of b2+b3; Part of b2, then the remainder of b2 together with the all of b1+b3; Etc; in a way similar to the above process. One preferred embodiment is as above when polyol b2 is reacted with the polyisocyanate a) to form a prepolymer.

The following examples illustrate the invention without limiting same. Unless otherwise indicated, all parts are given by weight.

Glossary
(all functionalities are nominal functionalities, and equivalent weights are nominal equivalent weights and OH value is in mg KOH/g)

| | |
|---|---|
| Polyol A | PO/EO, with EO as random. EO content is 75% by weight. Equivalent weight is 2004 functionality is 3, OH value is 42. |
| Polyol B | PO-EO, with EO as tipped. EO content is 15% by weight. Equivalent weight is 2004 functionality is 3, OH value is 28 and primary hydroxyl content is 82%. |
| Polyol C | triethanolamine-initiated PO, functionality of 3, all PO, OH value is 450. |
| Isocyanate A | MDI comprising 78.2% by weight diisocyanate 26.0% by weight of which is 2,4'-MDI and 21.8% by weight is oligomer species of higher functionality. Functionality is 2.19. NCO value is 32.6% by weight. |
| Isocyanate B | Semi-prepolymer based on MDI (77.4% by weight diisocyanate 20.4% by weight of which is 2,4'-MDI and 22.6% by weight is oligomer species of higher functionality, Functionality is 2.20.) and polyol B. NCO value is 19.8% by weight. |
| D33LV | Catalyst from Air Products |
| B4113 | surfactant from Goldschmidt |
| TELA | Triethanolamine |

Foams are produced according to the following scheme. Polyols, catalysts, surfactants, water are mixed prior to the addition of isocyanates. Polyol blends and isocyanates are mixed at 20° C. during 8 seconds before foaming. Free-rise foams are made in plastic buckets of 2.5 l to 10 l.

The properties of the foam are determined according to the following methods and standards:

| | |
|---|---|
| FRD (Free Rise Density) | ISO 845 |
| Compression hardness, CLD 40% (kpa) | ISO 3386-1 |
| Hysteresis Loss (%) | ISO 3386-1 |
| Compression set (thickness)Dry at 75% (%) and Humid at 75% (%) | ISO 1856 |
| Resilience: (%) | Toyota |
| Tear strength (N/m), Max: | ISO 8067 |
| Tensile strength (kPa) and Elongation (%): | ISO 1798 |

The results are summarized in the following tables, examples 1 to 8 are obtained using a prepolymer process (polyol B being introduced via the isocyanate prepolymer) while examples 9 to 12 are obtained using a one-shot process.

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | Component | | | | | | | | | | | |
| Polyol A | 77 | 70 | 70 | 75 | 75 | 70 | 60 | 80 | 30 | 40 | 40 | 30 |
| Polyol B | | | | | | | | | 50 | 30 | 40 | 40 |
| Polyol C | 23 | 30 | 30 | 25 | 25 | 30 | 40 | 20 | 20 | 30 | 20 | 30 |
| Water | 2.5 | 2.5 | 2.5 | 2.5 | 2.5 | 2.5 | 2 | 2.5 | 2.4 | 2.5 | 2.4 | 2 |
| B 4113 | — | — | — | 0.7 | — | 0.7 | 0.7 | 0.7 | — | — | — | — |
| D 33 LV | 0.3 | 0.3 | 0.3 | 0.3 | 0.3 | 0.3 | 0.3 | 0.3 | 0.3 | 0.3 | 0.3 | 0.3 |
| TELA | — | — | — | — | — | — | — | 1.5 | — | — | — | — |
| Isocyanate A | — | — | — | — | — | — | — | — | 50 | 60 | 50 | 53 |
| Isocyanate B | 100 | 100 | 110 | 100 | 100 | 100 | 100 | 100 | — | — | — | — |
| NCO index | 90 | 82 | 90 | 88 | 88 | 82 | 80 | 89 | 81 | 82 | 81 | 81 |

-continued

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Properties | | | | | | | | | | | | |
| Cells | open | open | open | open | open | open | open* | open | open | open | open | open* |
| FRD (kg/cm$^3$) | 56.8 | 58.1 | 55.8 | 59.3 | 58.2 | 58.6 | 57.7 | 62.3 | 49.8 | 42.2 | 46.6 | 52.6 |
| Foaming Cream Time(s) | 24 | 25 | 25 | 19 | 20 | 22 | 19 | 20 | 16 | 13 | 15 | 15 |
| End Of Rise (s) | 70 | 87 | 96 | 100 | 96 | 86 | 75 | 85 | 70 | 58 | 66 | 69 |
| Compression hardness | | | | | | | | | | | | |
| CLD 40% (kpa) | 2.42 | 1.85 | 2.67 | 2.3 | 2.1 | 1.6 | 1.5 | 3.1 | nd | nd | nd | nd |
| Hysteresis (%) | 22.6 | 27.2 | 37.2 | 33.2 | 34.5 | 35.9 | 44.1 | 29.9 | nd | nd | nd | nd |
| Compression set (thick) | | | | | | | | | | | | |
| Dry 75% (%) | 1.4 | 1.5 | 1.5 | — | — | — | — | — | — | — | — | — |
| Humid 75% (%) | −1.7 | −1.7 | −1.5 | — | — | — | — | — | — | — | — | — |
| Resilience (%) | 9.5 | 7.3 | 6.1 | — | — | — | — | — | — | — | — | — |
| Tear strength Max (N/m) | 111.5 | 99.7 | 149.7 | — | — | — | — | — | — | — | — | — |
| Tensile strength (kpa) | 28.0 | 24.5 | 45.2 | — | — | — | — | — | — | — | — | — |
| Elongation (%) | 106.3 | 136.2 | 125.8 | — | — | — | — | — | — | — | — | — |

*borderline

What is claimed is:

1. A polyol composition comprising:
   b1) a polyoxyethylene-polyoxypropylene polyol, having an average nominal hydroxyl functionality of 2–6, where the EO is present as tipped EO and/or random EO, the total EO content being at least 50% by weight;
   b2) a polyoxyethylene-polyoxypropylene polyol, having an average nominal hydroxyl functionality of 2–6 and having a primary hydroxyl content of at least 50%, the EO content being from 10 to 25% by weight;
   b3) an amine-initiated polyoxypropylene polyol, having an average nominal hydroxyl functionality of 2–6, and having an OH value greater than 400 mg KOH/g,
   these polyols b1, b2 and b3 being present according to the following proportions, based on the combined weights of b1, b2 and b3, b1: 20–70 wt %, b2: 5–50 wt %, b3: 5–50 wt %.

2. The polyol composition according to claim 1, which comprises the polyol b3 in amount of at least 20 wt %.

3. The polyol composition according to claim 1, which comprises the polyols 1, b2 and b3 according to the following proportions: b1: 30–65 wt %. b2: 10–40 wt %, b3: 20–40 wt %.

4. The polyol composition of claim 1, wherein the functionality of the polyols b1, b2 and b3 is 2–4.

5. Process for preparing a cold-setting flexible polyurethane foam at an NCO index of 70–120 by reacting:
   a) a polyisocyanate composition;
   b1) a polyoxyethylene-polyoxypropylene polyol, having an average nominal hydroxyl functionality of 2–6, where the EO is present as tipped EO and/or random EO, the total EO content being at least 50% by weight;
   b2) a polyoxyethylene-polyoxypropylene polyol, having an average nominal hydroxyl functionality of 2–6 and having a primary hydroxyl content of at least 50%, the EO content being from 10 to 25% by weight;
   b3) an amine-initiated polyoxypropylene polyol, having an average nominal hydroxyl functionality of 2–6,
   these polyols b1, b2 and b3 being present according to the following proportions, based on the combined weights of b1, b2 and b3, b1: 20–70 wt %, b2: 5–50 wt %, b3: 5–50 wt %; and
   c) water; optionally in the presence of
   d) additives and auxiliaries known per se.

6. The process of claim 5, in which the polyols b1), b2) and b3) are used according to the following proportions: b1: 30–65 wt %, b2: 10–40 wt %, b3: 20–40 wt %.

7. The process of claim 5, in which the amine-initiated polyoxypropylene polyol b3) has an OH value greater than 400 mg KOH/g.

8. The process of claim 5, wherein the functionality of the polyols b1, b2 and b3 is 2–4.

9. The process of claim 5, in which the b3 has an OH value greater than 400 mg KOH/g.

10. The process of claim 5, wherein the polyisocyanate is diphenyl methane diisocyanate and the NCO index is 70–100.

11. The process of claim 5, wherein an amine-based catalyst is used in an amount such that the corresponding amount of nitrogen calculated on 100 parts of polyols b1), b2) and b3) is below 0.04% by weight.

12. The process of claim 11, for the preparation of metal salt free, slabstock foams, wherein the amount of nitrogen is less than 0.01% by weight.

13. The process of claim 5, which process is a one-shot process.

14. The process of claim 5, which process is a prepolymer process, where the prepolymer comprises the reaction product of the polyisocyanate composition a) and the polyol b2.

15. A flexible foam obtained by the process of claim 5.

16. A reaction system comprising A) a polyisocyanate and B) an isocyanate-reactive component comprising the polyol composition of claim 1 and water.

17. A reaction system comprising:
   A) a polyisocyanate prepolymer obtained by reacting a polyisocyanate with part of the polyol composition of claim 1, and
   B) an isocyanate-reactive component comprising the remainder of said polyol composition and water.

18. The reaction system of claim 17, in which the prepolymer is obtained by reacting the polyisocyanate with polyol b2.

* * * * *